United States Patent
Zhuo et al.

(10) Patent No.: US 10,033,592 B2
(45) Date of Patent: Jul. 24, 2018

(54) METHOD AND SYSTEM FOR MONITORING NETWORK LINK AND STORAGE MEDIUM THEREFOR

(71) Applicant: Baidu Online Network Technology (Beijing) Co., Ltd., Beijing (CN)

(72) Inventors: Zecheng Zhuo, Beijing (CN); Pengfei Zhang, Beijing (CN); Bixi Wang, Beijing (CN); Bin Liu, Beijing (CN); Wenbo Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 150 days.

(21) Appl. No.: 14/902,308

(22) PCT Filed: Dec. 11, 2014

(86) PCT No.: PCT/CN2014/093557
§ 371 (c)(1),
(2) Date: Dec. 30, 2015

(87) PCT Pub. No.: WO2016/033897
PCT Pub. Date: Mar. 10, 2016

(65) Prior Publication Data
US 2016/0226714 A1 Aug. 4, 2016

(30) Foreign Application Priority Data
Sep. 2, 2014 (CN) .......................... 2014 1 0443239

(51) Int. Cl.
*H04L 12/24* (2006.01)
*H04L 12/26* (2006.01)

(52) U.S. Cl.
CPC ............ *H04L 41/12* (2013.01); *H04L 41/044* (2013.01); *H04L 41/0677* (2013.01);
(Continued)

(58) Field of Classification Search
CPC .............................. H04L 41/12; H04L 41/044
(Continued)

(56) References Cited

U.S. PATENT DOCUMENTS

| | | | |
|---|---|---|---|
| 8,543,682 B2 * | 9/2013 | Menon | H04L 1/205 709/217 |
| 2009/0067324 A1 * | 3/2009 | Licardie | H04L 12/40182 370/225 |
| 2012/0162633 A1 | 6/2012 | Roberts et al. | |
| 2013/0107729 A1 * | 5/2013 | Wagner | H04L 43/0882 370/252 |

(Continued)

FOREIGN PATENT DOCUMENTS

| | | |
|---|---|---|
| CN | 101030895 A | 9/2007 |
| CN | 101051954 A | 10/2007 |

(Continued)

OTHER PUBLICATIONS

International Search Report PCT/CN2014/093557 dated Jun. 5, 2015.

*Primary Examiner* — Mark Rinehart
*Assistant Examiner* — Peter G Solinsky
(74) *Attorney, Agent, or Firm* — Nixon Peabody LLP; Justin D. Swindells

(57) ABSTRACT

A method of monitoring network links is disclosed which includes: issuing, by a primary node module, a configuration file to a plurality of secondary node modules; receiving, by the secondary node modules, the configuration file, and performing a least link coverage algorithm to the configuration file, obtaining a set of least link coverages of a data detection stream between the secondary node modules; performing, by the secondary node modules, a one-way delay detection algorithm, performing one-way delay detection to the set of least link coverages, obtaining a one-way delay detection result, and returning the one-way delay detection result to the primary node module; and determining, by the primary node module, whether to trigger an alarm program based on a set alarm threshold. Links of the entire (Continued)

network are monitored more accurately and efficiently, while solving the asymmetric link delay issue, and may locate a failed link quickly.

14 Claims, 6 Drawing Sheets

(52) U.S. Cl.
CPC ........ *H04L 41/0806* (2013.01); *H04L 41/142* (2013.01); *H04L 43/0858* (2013.01); *H04L 43/12* (2013.01)

(58) Field of Classification Search
USPC .......................................................... 370/248
See application file for complete search history.

(56) References Cited

U.S. PATENT DOCUMENTS

| | | | |
|---|---|---|---|
| 2015/0117526 | A1 | 4/2015 | Choi et al. |
| 2016/0028604 | A1* | 1/2016 | Chakrabarti ........ H04L 43/0852 370/252 |
| 2016/0226714 | A1 | 8/2016 | Zhuo et al. |

FOREIGN PATENT DOCUMENTS

| | | | |
|---|---|---|---|
| CN | 102035696 | A | 4/2011 |
| CN | 102468991 | A | 5/2012 |
| CN | 103384376 | A | 11/2013 |
| CN | 104202190 | A | 12/2014 |

* cited by examiner

METHOD AND SYSTEM FOR MONITORING NETWORK LINK AND STORAGE MEDIUM THEREFOR

CROSS REFERENCE TO RELATED APPLICATIONS

This application is national phase of PCT/CN2014/093557, filed Dec. 11, 2014, which claims priority to Chinese Patent Application No. 201410443239.6 filed on Sep. 2, 2014 entitled "Method and Device for Monitoring Network Link", the contents of which are incorporated herein by reference in its entirety.

FIELD OF THE INVENTION

The present invention relates to the communication field, and particularly relates to a method and system for monitoring network links and a storage medium therefor.

BACKGROUND OF THE INVENTION

With the development of network information, the network development of an enterprise also progresses constantly. Generally, IDC (Internet datacenters) network of enterprises are ubiquitous across many different regions. Moreover, multi-layered network devices are existent inside an IDC and inter-IDCs; therefore, there is a big challenge to monitor link quality of an entire network. First, the link data of the entire network is very huge, such that it is generally hard to monitor all links; second, because the round-trip paths of an asymmetric network are inconsistent, an end-to-end delay cannot be accurately tested; finally, when the network fails, it is very hard to quickly locate a failed link.

The existing network link monitor technology, although it may confirm that congestion occurs in a certain port of a certain device at the time by collecting device port traffic, it cannot confirm the congestion condition of the entire traffic data flow, and cannot measure an end-to-end delay. A generally employed traceroute tool at two ends of the server has the following problems: it is unable to monitor all links of the whole network; it is unable to solve the issue caused by an asymmetric link; and it is unable to locate a problem quickly.

SUMMARY OF THE INVENTION

In order to monitor network links accurately, efficiently, and comprehensively, embodiments of the present invention provide a method and system for monitoring network links and a storage medium therefor.

In one aspect, an embodiment of the present invention provides a method for monitoring network links, comprising:

issuing, by a primary node module, a configuration file to a plurality of secondary node modules;

receiving, by the secondary node modules, the configuration file, and performing a least link coverage algorithm to the configuration file, obtaining a set of least link coverages of a data detection stream between the secondary node modules;

performing, by the secondary node modules, a one-way delay detection algorithm, performing one-way delay detection to the set of least link coverages, obtaining a one-way delay detection result, and returning the one-way delay detection result to the primary node module; and determining, by the primary node module, whether to trigger an alarm program based on a set or predetermined alarm threshold.

Correspondingly, an embodiment of the present invention provides a system for monitoring network links, comprising: a processor; and a memory storing computer-readable instructions which, when executed by the processor, the processor is operable for:

issuing, by a primary node module, a configuration file to a plurality of secondary node modules;

receiving, by the secondary node modules, the configuration file, and performing a least link coverage algorithm to the configuration file, obtaining a set of least link coverages of a data detection stream between the secondary node modules;

performing, by the secondary node modules, a one-way delay detection algorithm, performing one-way delay detection to the set of least link coverages, obtaining a one-way delay detection result, and returning the one-way delay detection result to the primary node module; and determining, by the primary node module, whether to trigger an alarm program based on a set or predetermined alarm threshold.

Furthermore, an embodiment of the present invention also provides a non-transitory computer storage medium containing computer-readable instructions, that when executed by one or more devices, the one or more devices are configured for:

issuing, by a primary node module, a configuration file to a plurality of secondary node modules;

receiving, by the secondary node modules, the configuration file, and performing a least link coverage algorithm to the configuration file, obtaining a set of least link coverages of a data detection stream between the secondary node modules;

performing, by the secondary node modules, a one-way delay detection algorithm, performing one-way delay detection to the set of least link coverages, obtaining a one-way delay detection result, and returning the one-way delay detection result to the primary node module; and determining, by the primary node module, whether to trigger an alarm program based on a set or predetermined alarm threshold.

Implementation of various embodiments of the present invention may monitor all links of the entire network accurately, efficiently, and comprehensively, and meanwhile solve the delay issue caused by an asymmetric link, and locate a failed link quickly.

BRIEF DESCRIPTION OF THE ACCOMPANYING DRAWINGS

DETAILED DESCRIPTION OF THE PREFERRED EMBODIMENTS

Hereinafter, various aspects of the present invention will be described in detail with reference to the accompanying drawings and preferred embodiments, wherein the well-known modules, units, and the connections, links, communications or operations therebetween may not be described in detail. Moreover, the described features, architecture or functions may be combined in any manner in one or more of the above embodiments. Those skilled in the art should understand, various embodiments below are only for exemplary illustration, not intended to limit the protection scope of the present invention. It may also be easily understood that the modules or units or processing manners in various embodiments as shown herein and the accompanying drawings may be combined and designed according to various different configurations.

Figure 1:
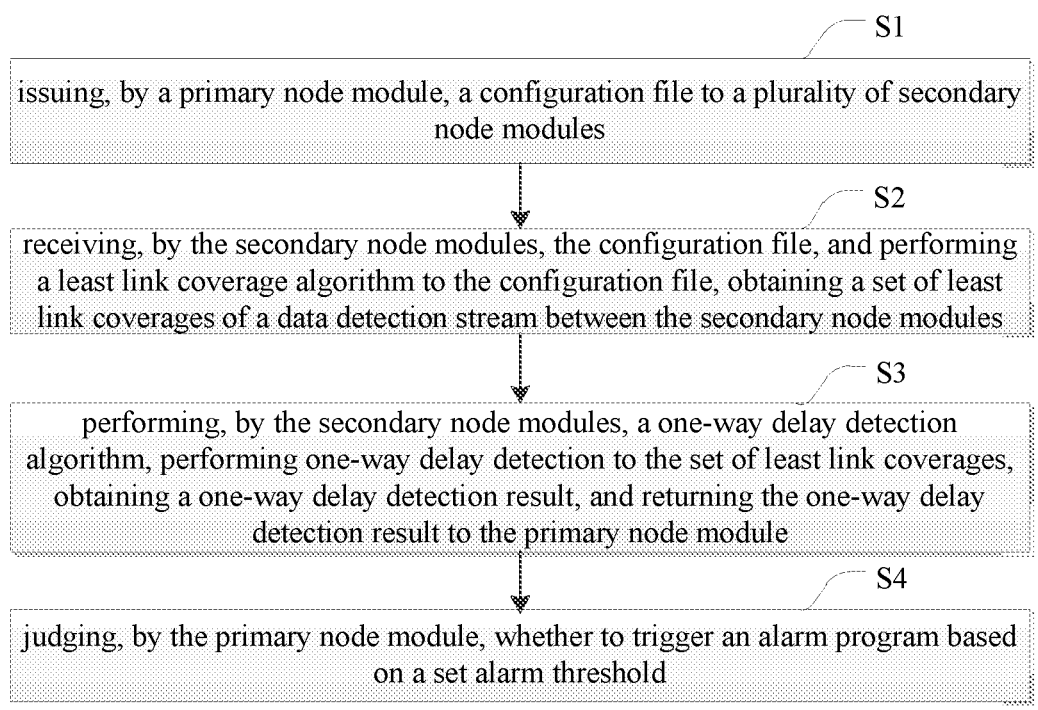
FIG. 1 shows a flow diagram of a method for monitoring network links according to an embodiment of the present invention.

FIG. 1 shows a flow diagram of a network link monitoring method according to an embodiment of the present invention. With reference to FIG. 1, in the embodiment of the present invention, the method comprises:

Step S1: issuing, by a primary node module, a configuration file to a plurality of secondary node modules;

Step S2: receiving, by the secondary node modules, the configuration file, and performing a least link coverage algorithm to the configuration file, obtaining a set of least link coverages of a data detection stream between the secondary node modules;

Step S3: performing, by the secondary node modules, a one-way delay detection algorithm, performing one-way delay detection to the set of least link coverages, obtaining a one-way delay detection result, and returning the one-way delay detection result to the primary node module; and Step S4: determining, by the primary node module, whether to trigger an alarm program based on a set or predetermined alarm threshold.

Wherein the primary node module will receive a configuration file from the user (including the detection period of the data detection stream, a list of source machine rooms and target machine rooms to detect, the alarm threshold, etc.), and distribute these configuration files to each secondary node module via an HTTP link. The primary node module receives the detection result returned by the secondary mode modules periodically, and determines whether to trigger an alarm program based on the alarm threshold preset or predetermined by the user, and meanwhile presents the detection result at a front end through a Web server. During the application process, the user first issues the configuration file to the secondary node modules through a to-be-monitored machine room, and then re-loads the primary node module which will automatically issues the configuration file to each secondary node module; after receiving a new configuration file, each secondary node module will promptly and automatically update its configuration file, and perform periodic detection based on the new configuration file, and then return the detection result to the primary node module. The primary node module summarizes these detection results and presents the results at the front end, and meanwhile judges or determines whether to trigger an alarm program based on an alarm threshold of the preset or predetermined value; the manner for triggering an alarm program may comprise an email alarm or a short message alarm, etc.

Figure 2:
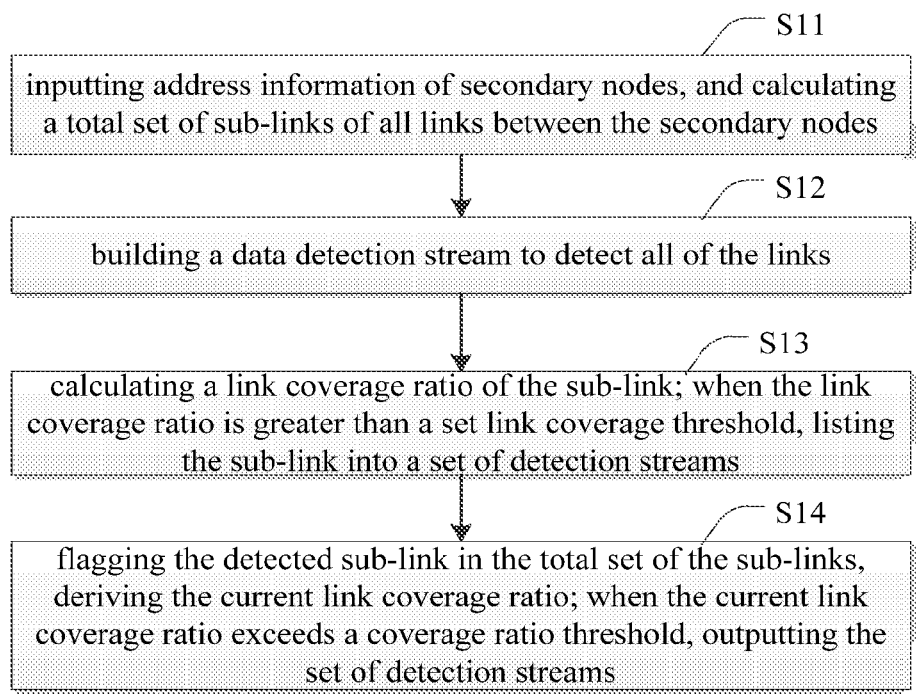
FIG. 2 shows a specific flow diagram of the least link coverage algorithm in step S2 in FIG. 1.

FIG. 2 shows a specific flow diagram of the least link coverage algorithm in step S2 in FIG. 1. With reference to FIG. 2, in an embodiment of the present invention, the least link coverage algorithm comprises:

Step S11: inputting address information of secondary nodes, and calculating a total set of sub-links of all links between the secondary nodes;

Step S12: building a data detection stream to detect all of the links;

Step S13: calculating a link coverage ratio of the sub-link; when the link coverage ratio is greater than a set link coverage threshold, listing the sub-link into a set of detection streams; and Step S14: flagging the detected sub-link in the total set of the sub-links, deriving the current link coverage ratio; when the current link coverage ratio exceeds a coverage ratio threshold, outputting the set of detection streams, then the set of detected streams is the set of least link coverages of the data detection stream between the secondary node modules.

In order to monitor the links of the entire network, if all of the links are traversed, it is needed to build a considerable number of detection flows, which not only consume server resources, but also too many detection data streams which will also occupy too much bandwidth. In order to solve these problems, it is needed to monitor the links of the entire network with a detection stream as least or small as possible, while occupying few server resources and bandwidth. Therefore, the least stream link coverage algorithm may be employed to solve these problems. The least link coverage algorithm indirectly solves the problems by converting various link manners between two servers into a total number of sub-links between devices. For example, if a sub-link congests, all links through the sub-link will be congested, such that by converting the link coverage between two servers into a coverage of all sub-links between devices which the two servers pass, link conditions of all possible paths between the two servers may be monitored with a smaller detection stream. It should be noted that the link coverage threshold and the coverage ratio threshold are set or predetermined based on the requirement of link coverage, wherein the link coverage threshold is used to cover various customized thresholds of all sublinks with detection steams as least or small as possible, e.g., the link coverage ratio of the first detection stream is 100%, while the coverage ratio threshold is used to embody the coverage ratio of the existing detection streams over the entire network; ideally, when the coverage ratio threshold is 100%, all links in the entire network are covered. Of course, in order to save detection time and the cost of detection resources, the link coverage ratio threshold may be customized, e.g., 90% or 50%, etc.

Figure 3:
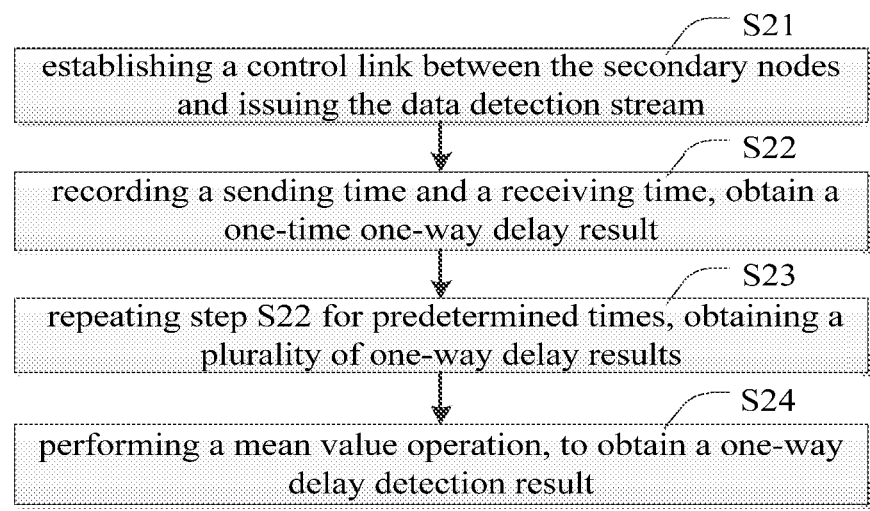
FIG. 3 shows a specific flow diagram of the one-way delay detection algorithm in step S3 in FIG. 1.

FIG. 3 shows a specific flow diagram of the one-way delay detection algorithm in step S3 in FIG. 1. With reference to FIG. 3, in embodiments of the present invention, the one-way delay detection algorithm comprises:

Step S21: establishing a control link between the secondary nodes and issuing the data detection stream;

Step S22: recording a sending time of sending the data detection stream at the sending end, recording a receiving time of receiving the data detection stream at the receiving end, and calculating a difference between the sending time and the receiving time to obtain a one-time one-way delay result;

Step S23: repeating step S22 for predetermined times, obtaining a one-way delay result of the predetermined times; and Step S24: performing a mean value operation to the one-way delay result of the predetermined times, to obtain a one-way delay detection result.

The one-way delay detection algorithm is used for handling an issue that the inconsistent round-trip paths brought by an asymmetric network which cannot accurately test an end-to-end delay. By first establishing a control link between two servers, then performing detection using a data flow detected by linkCover, and recording the timestamp of the sending time and the timestamp of the arriving time, the difference therebetween is just the one-way delay data. In order to obtain a more accurate one-way delay data, a measurement may be made by averaging multiple measurements. Of course, with increase of the measurement times, the measurement time will be prolonged and the measurement efficiency will be lowered. Therefore, in order to arrive at the optimal measurement state, i.e., obtaining relatively accurate one-way delay data with relatively less time; the predetermined times for measurement is controlled at 3-5 times.

Figure 4:
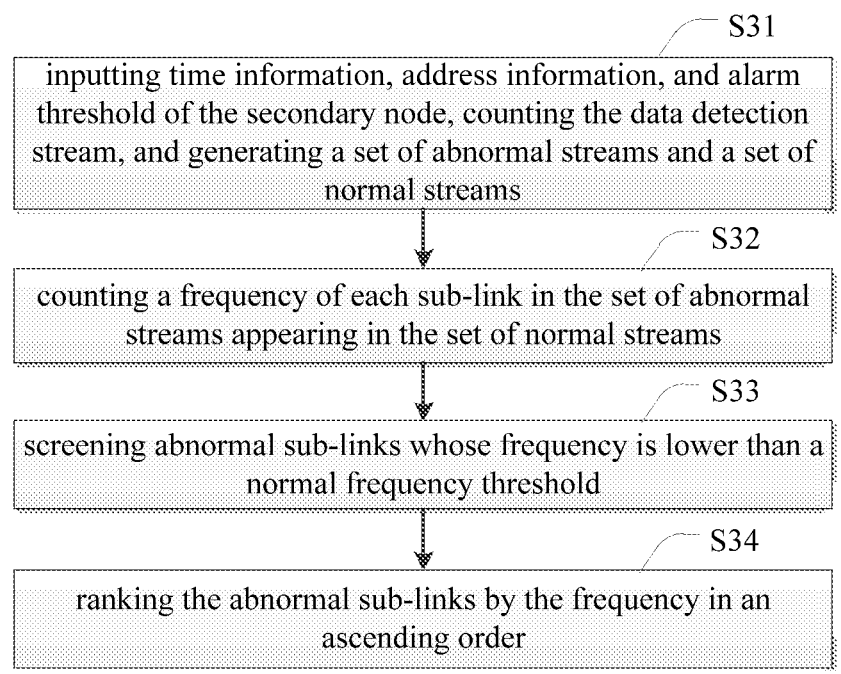
FIG. 4 shows a specific flow diagram of the link abnormality localization algorithm performed when the alarm program starts.

FIG. 4 shows a specific flow diagram of the link abnormality localization algorithm performed when the alarm program starts. With reference to FIG. 4, in an embodiment of the present invention, the link abnormality localization algorithm comprises:

Step S31: inputting time information, address information, and alarm threshold of the secondary node, counting the data detection stream between the secondary nodes, and generating a set of abnormal streams and a set of normal streams;

Step S32: counting a frequency of each sub-link in the set of abnormal streams appearing in the set of normal streams;

Step S33: screening abnormal sub-links whose frequency is lower than a normal frequency threshold; and Step S34: ranking the abnormal sub-links by the frequency in an ascending order.

The link abnormality localization algorithm is used for solving the problem of how to quickly locate a failure link when the network link has a problem. By narrowing the scope of troubleshooting the problematic links, the time of locating the problem is reduced by locating the problematic link at the sub-link level. In step S33, the "normal frequency threshold" is a minimum value of the frequency in normal circumstances, which may be set or determined autonomously (e.g., three times, five times, or ten times); "screening abnormal sub-links whose frequency is lower than a normal frequency threshold" refers to screening the abnormal sub-links whose frequency is 0, substantially 0, or relatively small as counted in step S32, because such links are usually the most possible causes of network congestion; then step S34 is performed to rank the abnormal sub-links by frequency in an ascending order, which facilitates the network maintenance and operation staffs to narrow the scope of troubleshooting, thereby quickly locating the network failure. Additionally, loss of service traffic will not be incurred due to employment of building the data detection stream, rather than employment of an actual service stream.

Figure 5:
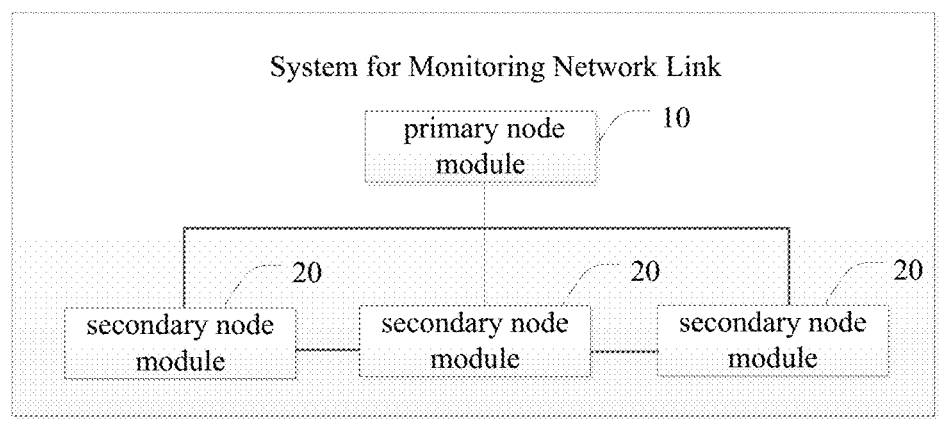
FIG. 5 shows an architecture diagram of a system for monitoring network links according to an embodiment of the present invention.

FIG. 5 shows an architecture diagram of a system for monitoring network links according to an embodiment of the present invention. With reference to FIG. 5, in the embodiment of the present invention, the system comprises:

a primary node module 10 configured to issue a configuration file to a plurality of secondary node modules 20; receive the one-way delay detection result returned from the secondary node modules 20, and judge whether to trigger an alarm program based on a set or predetermined alarm threshold; and a plurality of secondary node modules 20 configured to receive the configuration file, perform a least link coverage algorithm, obtain a set of least link coverages of a data detection stream between the secondary node modules, and then perform a one-way delay detection algorithm, perform one-way delay detection to the set of least link coverages, obtain a one-way delay detection result, and return the one-way delay detection result to the primary node module 10.

The primary node module 10 may be associated with a Web server; the primary node module 10 receives a configuration file from the user through the Web server (including: a detection period of the data detection stream, a list of source machine rooms and target machine rooms as detected, alarm threshold, etc.), and issues these configuration files to respective secondary node modules 20 via an HTTP connection. The primary node module 10 periodically receives the detection result returned from secondary node module 20, and decides whether to trigger an alarm program based on an alarm threshold preset or predetermined by the user, and meanwhile presents the detection result at the front-end through the Web server.

Figure 6:
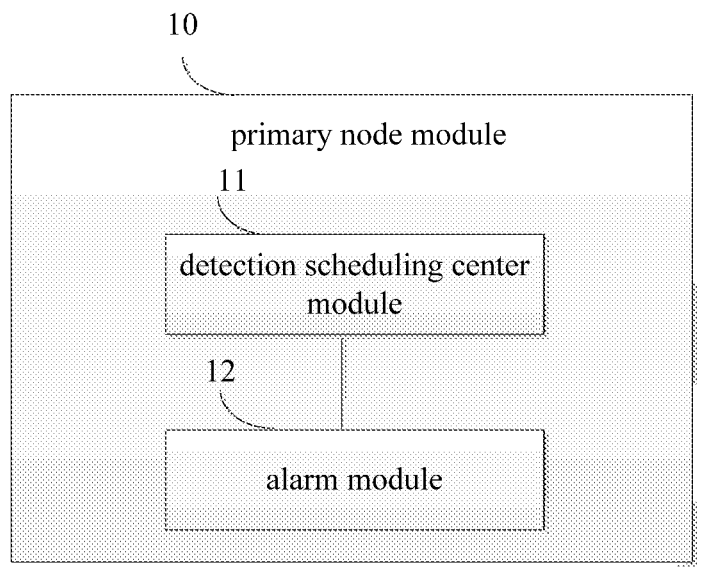
FIG. 6 shows a block diagram of the primary node module 10 in FIG. 5.

FIG. 6 shows a block diagram of the primary node module 10 in FIG. 5. With reference to FIG. 6, in embodiments of the present invention, the primary node module 10 comprises:

a detection scheduling center module 11 configured to issue a configuration file to the plurality of secondary node modules; and an alarm module 12 configured to receive the one-way delay detection result returned by the secondary node modules, and judge whether to trigger an alarm program based on a set or predetermined alarm threshold.

Here, the detection scheduling center module 11 will issue the configuration file to respective secondary node modules automatically; the respective secondary node modules, after receiving a new configuration file, will update their respective configuration files promptly automatically, and perform periodic detection based on the new configuration file, then returns the detection result to the detection scheduling center module 11. The detection scheduling center module 11 counts these detection results and presents them at the front end, meanwhile determining whether to trigger the alarm module 12 based on the alarm threshold of the preset or predetermined value.

Figure 7:
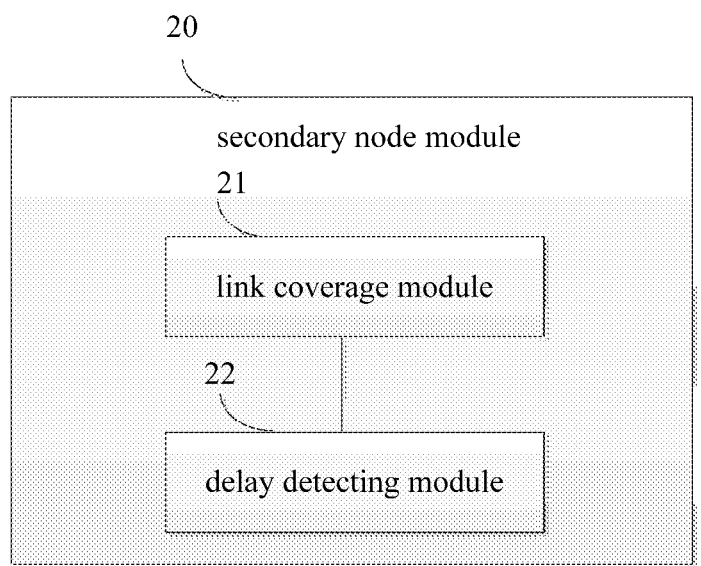
FIG. 7 shows a block diagram of the secondary node module 20 in FIG. 5.

FIG. 7 shows a block diagram of the secondary node module 20 in FIG. 5. With reference to FIG. 7, in embodiments of the present invention, the secondary node module 20 comprises:

a link coverage module 21 for receiving the configuration file, performing the least link coverage algorithm, and obtaining a set of least link coverages of the data detection stream between the secondary node modules; and a delay detecting module 22 for performing a one-way delay detection algorithm, performing one-way delay detection to the set of least link coverages, obtaining a one-way delay detection result, and returning the one-way delay detection result to the primary node module.

The secondary node module may also comprise: an abnormality locating module for performing a link abnormality localization algorithm to locate a failed sub-link when the alarm program starts.

Herein, the link coverage module 21 and the delay detecting module 22 are two parallel and associated modules; the link coverage module 21 is used for performing the least link coverage algorithm to the received data detection stream, thereby obtaining a preferred link coverage solution covering as many links as possible or all links with data detection streams as least or small as possible. The link coverage module 21 may be a reserved module of the delay detecting module 22. Specifically, at first, a set of least link coverages of the data detection stream between the secondary node modules is obtained by the link coverage module 21, and then a one-way delay detection result is obtained and returned to the primary node module by the delay detection module 22. It should be noted that, in order to perform link detection and monitor more efficiently and reasonably, during a detection period, the link coverage module 21 may only operate once to obtain the set of least link coverages; then, the delay detecting module 22 may repetitively use the set of least link coverages obtained from the link coverage module 21 to perform one-way delay detection according to the need of the one-way delay detection. Additionally, the abnormality localization module is a module that runs only when the alarm module in the primary node module initiates the alarm program, which may quickly locate a failed sub-link by performing the link abnormality localization algorithm, and returns a locating result to the primary node module, thereby solving the locating issue of network abnormality links effectively.

The system for monitoring network links of the present invention comprises a processor and a memory storing computer-readable instructions, when the computer-readable instructions are executed by the processor, the processor is operable to perform the steps according to the above method for monitoring network links. The method for monitoring network links employ the steps mentioned above.

Furthermore, an embodiment of the present invention also provides a non-transitory computer storage medium containing computer-readable instructions, that when executed by one or more devices, the one or more devices are configured to perform the steps according to the above method for monitoring network links.

The solution provided by the present invention can monitor all links of the entire network accurately, efficiently, and comprehensively, while solving the delay issue caused by an asymmetric link, and may locate a failed link quickly.

Through the depiction of the embodiments, those skilled in the art may clearly understand that the present invention may be implemented by software in conjunction with a hardware platform; which, of course, may also be implemented completely by hardware. Based on this understanding, all of part of the contribution of the technical solution of the present invention to the Background Technology may be embodied in a form of software product. The computer software product may be stored in a storage medium, e.g., ROM/RAM, magnetic disk, optical disk, etc., including several instructions to enable a computer device (which may be a personal computer, a server, a smart phone or a network device, etc.) to perform the method provided by various embodiments or some parts of the embodiments of the present invention.

The terms and expressions used in the description of the present invention are only for exemplary illustration, not intended to form a limitation. Those skilled in the art should understand that without departing from the basic principle of the embodiments as disclosed, various details in the embodiments may be subject to various changes. Therefore, the scope of the present invention is only determined by the claims. In the claims, unless otherwise indicated, all terms should be understood according to their broadest and most reasonable meanings.

What is claimed is:

1. A method for monitoring network link, comprising:
    issuing, by a primary node module, a configuration file to a plurality of secondary node modules;
    receiving, by the secondary node modules, the configuration file, and performing a least link coverage algorithm on the configuration file, obtaining a set of least link coverages of a data detection stream between the secondary node modules;
    performing, by the secondary node modules, a unidirectional delay detection algorithm, detecting a unidirectional delay of the set of least link coverages, obtaining a unidirectional delay detection result, and returning the unidirectional delay detection result to the primary node module; and
    judging, by the primary node module, whether to trigger an alarm program based on a set alarm threshold;
    wherein the least link coverage algorithm comprises:
        inputting address information of secondary nodes, and calculating a total set of sub-links of all links between the secondary nodes;
        building a data detection stream to detect the all links;
        calculating a link coverage ratio of the sub-link; when the link coverage ratio is greater than a set link coverage threshold, listing the sub-link in a set of detection streams; and
        flagging the detected sub-link in the total set of the sub-links, deriving a current link coverage ratio; when the current link coverage ratio exceeds a coverage ratio threshold, outputting the set of detection streams, the set of detection streams being the set of least link coverages of the data detection stream between the secondary node modules.

2. The method according to claim 1, wherein the link coverage threshold and the coverage ratio threshold are set based on a requirement of a link coverage.

3. The method according to claim 1, wherein the unidirectional delay detecting algorithm comprises:
    establishing a control link between the secondary nodes and issuing the data detection stream;
    recording a sending time of sending the data detection stream at the sending end, recording a receiving time of receiving the data detection stream at the receiving end, and calculating a difference between the sending time and the receiving time to obtain a one-time unidirectional delay result;
    repeating the recording and calculating a difference for a predetermined number of times, obtaining a unidirectional delay result of the predetermined number of times; and
    performing a mean value operation on the unidirectional delay result of the predetermined number of times, to obtain the unidirectional delay detection result.

4. The method according to claim 1, wherein when the alarm program is initiated, a link abnormality localization algorithm is performed to locate a failed sub-link.

5. The method according to claim 4, wherein the link abnormality localization algorithm comprises:
    inputting time information, address information, and alarm threshold of the secondary nodes, counting the data detection stream between the secondary nodes, and generating a set of abnormal streams and a set of normal streams;
    counting a frequency of each sub-link in the set of abnormal streams appearing in the set of normal streams;

screening abnormal sub-links having a frequency lower than a normal frequency threshold; and
ranking the abnormal sub-links by the frequency in an ascending order.

6. A system for monitoring network link, comprising:
a primary node module configured to issue a configuration file to a plurality of secondary node modules; receive a unidirectional delay detection result returned from the secondary node modules, and judge whether to trigger an alarm program based on a set alarm threshold; and
a plurality of secondary node modules configured to receive the configuration file, perform a least link coverage algorithm, obtain a set of least link coverages of a data detection stream between the secondary node modules; and then perform a unidirectional delay detection algorithm, detect a unidirectional delay of the set of least link coverages, obtain the unidirectional delay detection result, and return the unidirectional delay detection result to the primary node module;
wherein the least link coverage algorithm is configured to:
input address information of secondary nodes, and calculate a total set of sub-links of all links between the secondary nodes;
build a data detection stream to detect the all links;
calculate a link coverage ratio of the sub-link; when the link coverage ratio is greater than a set link coverage threshold, list the sub-link in a set of detection streams; and
flag the detected sub-link in the total set of the sub-links, and derive a current link coverage ratio; when the current link coverage ratio exceeds a coverage ratio threshold, output the set of detection streams, the set of detection streams being the set of least link coverages of the data detection stream between the secondary node modules.

7. The system according to claim 6, wherein the primary node module comprises:
a detection scheduling center module configured to issue a configuration file to the plurality of secondary node modules; and
an alarm module configured to receive the unidirectional delay detection result returned by the secondary node module, and determine whether to trigger an alarm program based on the alarm threshold as set.

8. The system according to claim 6, wherein the secondary node module comprises:
a link coverage module for receiving the configuration file, performing the least link coverage algorithm, and obtaining a set of least link coverages of the data detection stream between the secondary node modules; and
a time delay detecting module for performing the unidirectional delay detection algorithm, detecting unidirectional delay of the set of least link coverages, obtaining the unidirectional delay detection result, and returning the unidirectional delay detection result to the primary node module.

9. The system according to claim 8, wherein the secondary node module further comprises:
an abnormality locating module for performing the link abnormality locating algorithm to locate a failed sub-link when the alarm program starts.

10. A non-transitory computer storage medium containing one or more programs, that when executed by one or more devices, the one or more devices are configured for:
issuing, by a primary node module, a configuration file to a plurality of secondary node modules;
receiving, by the secondary node modules, the configuration file, and performing a least link coverage algorithm on the configuration file, obtaining a set of least link coverages of a data detection stream between the secondary node modules;
performing, by the secondary node modules, a unidirectional delay detection algorithm, detecting a unidirectional delay of the set of least link coverages, obtaining a unidirectional delay detection result, and returning the unidirectional delay detection result to the primary node module; and
judging, by the primary node module, whether to trigger an alarm program based on a set alarm threshold;
wherein the least link coverage algorithm comprises:
inputting address information of secondary nodes, and calculating a total set of sub-links of all links between the secondary nodes;
building a data detection stream to detect the all links;
calculating a link coverage ratio of the sub-link; when the link coverage ratio is greater than a set link coverage threshold, listing the sub-link in a set of detection streams; and
flagging the detected sub-link in the total set of the sub-links, deriving a current link coverage ratio; when the current link coverage ratio exceeds a coverage ratio threshold, outputting the set of detection streams, the set of detection streams being the set of least link coverages of the data detection stream between the secondary node modules.

11. The non-transitory computer storage medium according to claim 10, wherein the link coverage threshold and the coverage ratio threshold are set based on a requirement of a link coverage.

12. The non-transitory computer storage medium according to claim 10, wherein the unidirectional delay detecting algorithm comprises:
establishing a control link between the secondary nodes and issuing the data detection stream;
recording a sending time of sending the data detection stream at the sending end, recording a receiving time of receiving the data detection stream at the receiving end, and calculating a difference between the sending time and the receiving time to obtain a one-time unidirectional delay result;
repeating the recording and calculating a difference for a predetermined number of times to obtain a unidirectional delay result of the predetermined number of times; and
performing a mean value operation on the unidirectional delay result of the predetermined number of times, to obtain the unidirectional delay detection result.

13. The non-transitory computer storage medium according to claim 10, wherein when the alarm program is initiated, a link abnormality localization algorithm is performed to locate a failed sub-link.

14. The non-transitory computer storage medium according to claim 13, wherein the link abnormality localization algorithm comprises:
inputting time information, address information, and alarm threshold of the secondary nodes, counting the data detection stream between the secondary nodes, and generating a set of abnormal streams and a set of normal streams;
counting a frequency of each sub-link in the set of abnormal streams appearing in the set of normal streams;

screening abnormal sub-links having a frequency lower than a normal frequency threshold; and ranking the abnormal sub-links by the frequency in an ascending order.

* * * * *